United States Patent [19]

Thompson

[11] 4,160,209

[45] Jul. 3, 1979

[54] RESONANT CIRCUIT EXCITATION METHOD AND APPARATUS

[76] Inventor: Thomas F. Thompson, 3891 E. Amazon Dr., Eugene, Oreg. 97405

[21] Appl. No.: 812,133

[22] Filed: Jul. 1, 1977

[51] Int. Cl.[2] ........................ H04B 1/59; H04B 7/145

[52] U.S. Cl. ........................................ 325/64; 325/18; 328/114; 340/572; 343/6.5 SS

[58] Field of Search ............... 340/280, 505, 568, 571, 340/572, 674; 328/113, 114, 132, 223; 325/1, 8, 13, 64; 343/6.5 SS

[56] References Cited

U.S. PATENT DOCUMENTS 3,740,742 6/1973 Thompson .......................... 340/280

*Primary Examiner*—Robert L. Griffin
*Assistant Examiner*—Marc E. Bookbinder
*Attorney, Agent, or Firm*—Kolisch, Hartwell, Dickinson & Stuart

[57] ABSTRACT

A method and apparatus using a single-frequency oscillator as a source for resonating, selectively, an infinite number of different higher-frequency resonant circuits. The oscillator signal is clipped, and this clipped signal is processed in an infinitely adjustable amplifier to change the slopes of leading and trailing edges thereof. The amplifier also functions to cause these modified edges to extend over a predetermined signal-level range.

3 Claims, 2 Drawing Figures

RESONANT CIRCUIT EXCITATION METHOD AND APPARATUS

BACKGROUND AND SUMMARY OF THE INVENTION

This invention pertains to a method and apparatus for exciting or resonating resonant circuits, such as those which are commonly used today in so-called theft-protection merchandise tags. More particularly, the invention pertains to a method and apparatus whereby a single low-frequency oscillator may be used to excite or resonate an infinite number of different higher-frequency resonant circuits.

It is common practice today, in many fields of application, to use electrical resonant circuits as article or object identification tags. A very common use of these tags is made by merchants in the protection of their goods against shop-lifting. As an illustration, a tag containing a circuit resonant at a particular frequency is attached to an article. Usually there is provided a sensing station near the exits to a store, and in this station a transmitter transmits pulses at the frequency of the tags so as to excite any tag which passes through this region. Naturally, a tag passing through the region is excited or resonated by the transmission just mentioned, and in the intervals between transmitted pulses, the tag acts as a radiator itself of energy at the same frequency, which radiation is picked up by a suitable receiver that furnishes a warning signal.

There are many other applications where resonant circuits are similarly used. However, in the application just specifically described, as well as in the others, it is common to require a single controlled-frequency oscillator for each resonant circuit frequency which is used. Obviously, this can become an extremely costly proposition in situations where differentiation of objects or articles, as by using tags of different frequencies, is desired.

A general object of the present invention is to provide a unique method and apparatus which allows the use of virtually an infinite number of different-frequency resonant circuits, all excitable by a transmission source which uses but a single-frequency controlled oscillator.

Another object of the invention is to provide such a method and apparatus which are extremely simple and easy to use.

Various other objects and advantages which are attained by the invention will become more fully apparent as the description which now follows is read in conjunction with the accompanying drawings.

DETAILED DESCRIPTION OF THE INVENTION

Figure 1:
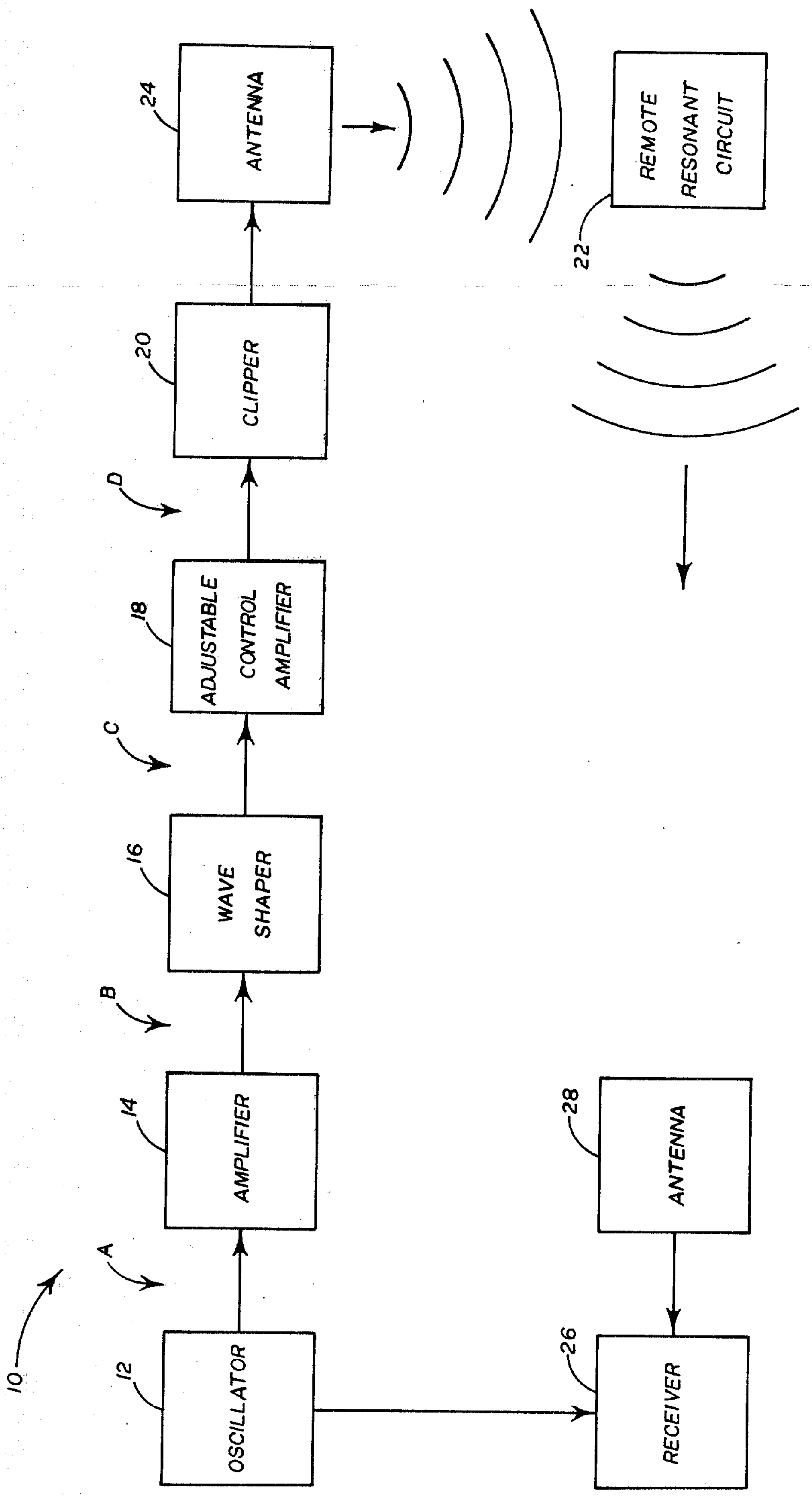
FIG. 1 is a block diagram illustrating one form of apparatus constructed in accordance with the present invention.

Turning now to the drawings, and referring first to FIG. 1, indicated generally at 10 is one embodiment of apparatus constructed in accordance with the present invention. Included in apparatus 10 are an oscillator 12, an amplifier 14, a wave shaper 16, an adjustable control amplifier 18, and a clipper 20. Each of these individual components of the apparatus are of conventional design and construction. Suitable operative connections are provided between these components, as illustrated by the lines with arrowheads extending between the blocks in FIG. 1 representing the components.

Preferably, oscillator 12 is a temperature-compensated crystal-controlled oscillator which produces a sine wave output signal that is fed to amplifier 14. As will become apparent, the frequency of the oscillator is completely a matter of choice, and in apparatus 10, oscillator 12 operates at a frequency of 1-megahertz.

Amplifier 14 functions in the apparatus somewhat as a preamplifier, and simply boosts the amplitude of the signal fed to it by oscillator 12. This preamplified or boosted signal is transmitted to the input of wave shaper 16.

In the particular embodiment of apparatus 10 now being described, the wave shaper includes a half-wave rectifier coupled to an amplitude clipper. The half-wave rectifier portion of the wave shaper selects the positive-going portion of the signal received from amplifier 14, and the clipper portion of the wave shaper limits the amplitude of this selected portion to a suitable level for feeding into the input of adjustable control amplifier 18.

Amplifier 18 may be thought of as a main amplifier in apparatus 10, and is provided with a suitable gain adjustment, which may be selectively manipulated by an operator, that allows for amplification of any signal fed to the amplifier to an infinite number of different amplified levels throughout a selected range of levels. Thus, what appears at the output of amplifier 18 ranges typically from a duplicate of what is received at the input (in terms of overall signal level) to a greatly amplified version of the signal furnished at such input.

The output of amplifier 18 is fed to the input of clipper 20 which functions, regardless of the amplitude of the signal furnished it by amplifier 18, to limit the maximum level of such signal to a predetermined level, which will be discussed more fully shortly.

As was mentioned earlier, the apparatus of the invention is intended for resonating or exciting a remote resonant circuit, such as that type of resonant circuit used in theft-detection tags. In FIG. 1, at 22 in block form, such a tag is schematically represented. Transmission of a signal from apparatus 10 to circuit 22 is effected by an antenna 24, of conventional design, suitably coupled to the output of clipper 20. As will become apparent, resonant circuit 22 may be constructed to resonate at any one of a different one of an infinite number of frequencies, but for the purpose of illustration herein, this circuit has been constructed to resonate at a frequency of 4-megahertz.

Completing a description of what is shown in FIG. 1, suitably coupled, for synchronization purposes, with oscillator 12 is a receiver 26 which is also coupled to an antenna 28. Both receiver 26 and antenna 28 are of conventional design. Receiver 26 is tuned to receive a 4-megahertz signal which is reradiated by resonant circuit 22.

Speaking in general terms about the operation of what is shown in FIG. 1, what is transmitted to circuit 22 (as will shortly be fully explained) are time-spaced pulses which cause circuit 22 to resonate at its frequency of 4-megahertz. During the intervals between such pulses, circuit 22 reradiates energy at its frequency of 4-megahertz, which reradiation is picked up by antenna 28 and fed to receiver 26 for response. The synchronization connection between the oscillator and the receiver is provided to identify for the receiver the time slots, so-to-speak, wherein the receiver should be prepared to respond to any reradiation from circuit 22. This general type of operation is generally well known to those skilled in the art.

Considering somewhat more specifically the operation of a typical resonant circuit like circuit 22, the circuit is caused to resonate when it receives a leading or trailing edge of a periodic wave which has a certain time-level slope—that is which extends over a predetermined range level, such as about 0.1 volts, within a time interval substantially equaling one quarter of the period of the frequency associated with the circuit. In resonant circuit 22, the 0.1 volt signal-level change is applicable, and the period of the resonant frequency of the circuit is about 0.250 microseconds. Hence, if circuit 22 is subjected to the leading or trailing edge of a periodic wave exhibiting this signal-level change in a period of time substantially equaling one quarter of the period just mentioned, namely about 0.063 microseconds, the circuit will resonate.

Figure 2:
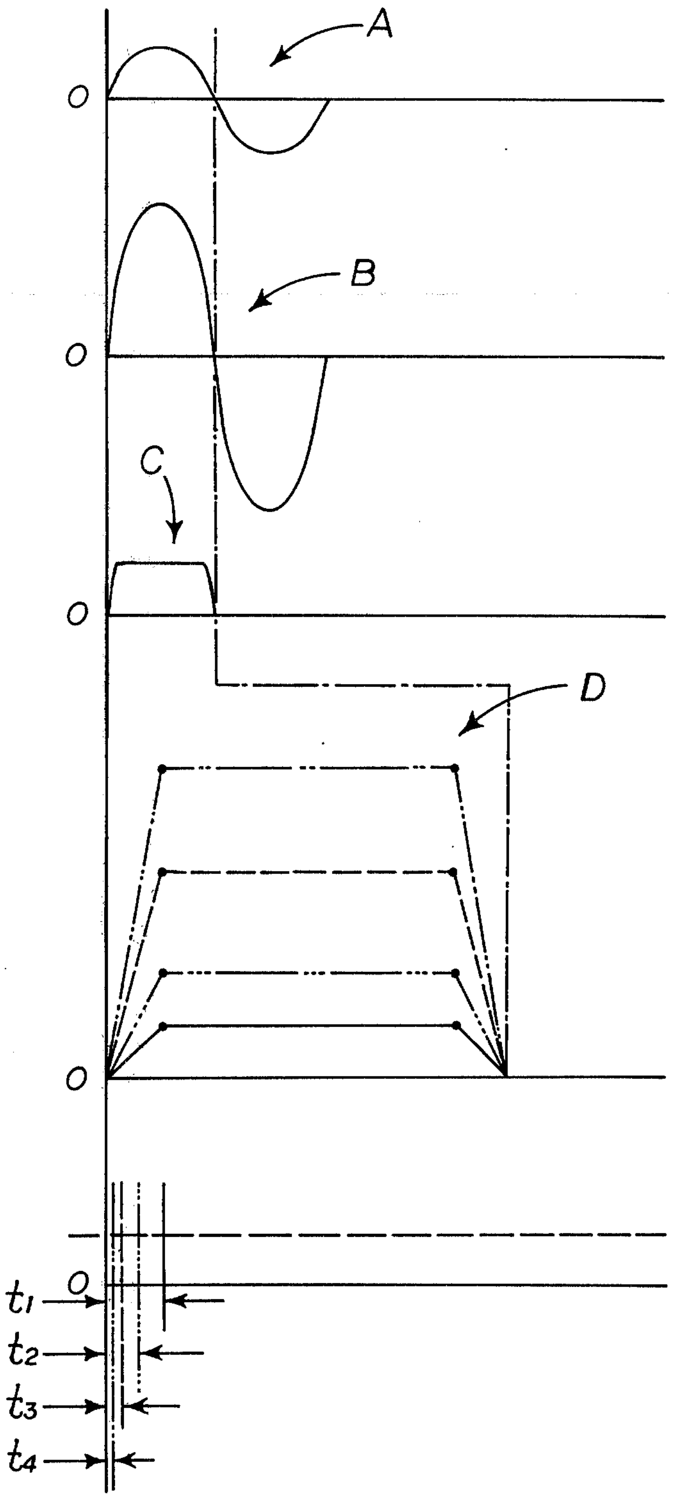
FIG. 2 is a time/voltage-level graph showing the shapes of various signal waveforms which may exist at different designated locations within the apparatus of FIG. 1.

Let us consider now the operation of apparatus 10 more specifically in conjunction with what is shown in the graphs of FIG. 2 in the drawings. As was mentioned earlier, oscillator 12 produces a sine wave output signal at a frequency, controlled by a crystal, of 1-megahertz. This is the signal which is fed to amplifier 14, and is the waveform uppermost in FIG. 2, designated A. It will be understood that time is represented on the horizontal axis in this graph, and voltage is represented on the vertical axis. Signal A rises and falls above and below a zero-voltage level.

Amplifier 14 simply amplifies the level of signal A to some other suitable level for feeding wave shaper 16, and this is depicted as waveform B in FIG. 2. Waveforms A and B in FIG. 2 are represented along a common time scale.

As was mentioned above, wave shaper 16 includes a half-wave rectifier circuit which selects the positive going portion of signal B. Further, it includes a signal-level clipper portion which limits the amplitude to a certain preselected level. Thus, what is provided at the output of the wave shaper is the waveform depicted at C in FIG. 2. It can be seen that this waveform is simply a level-clipped part of the positive-going portion of waveform B. The level at which clipping occurs may be any level suitable for feeding into control amplifier 18. In apparatus 10, clipping occurs at about +0.1 volts.

Indicated at D in FIG. 2 are four different representative output waveforms of signals produceable by control amplifier 18. The time scale used for these wave forms is roughly four times that used for waveforms A, B, and C—such being done for the purpose of clarity. As can be seen in waveform C, this waveform comprises a positive-going pulse having substantially symmetrically sloped leading and trailing edges which rise to and fall from a voltage level of about +0.1 volts. In the collection of the four waveforms represented at D in FIG. 2, the lowermost waveform which is drawn in solid lines is the same as waveform C, and represents a condition where control amplifier 18 is adjusted for so-called unity gain.

Naturally, because of the expanded time scale, the slopes of the leading and trailing edges of this waveform appear to be reduced somewhat. Recalling the operating characteristics of a resonant circuit like circuit 22, it will be observed that if waveform C is radiated to such a resonant circuit whose resonant frequency has a period which is four times the time spanned by the leading or trailing edge of waveform C, this resonant circuit will be resonated. Obviously, this time span is considerably smaller than one quarter of the period of the original 1-megacycle signal produced by oscillator 12, and more specifically, might typically represent one quarter of the period of a 4-megacycle frequency. The time span now being discussed is depicted at $t_1$ in FIG. 2. Clipper 20 in apparatus 10 is adjusted to clip any signal received by it to a level of about +0.1 volts. Hence, if a waveform like waveform C passes unamplified through amplifier 18, it will also pass unclipped through clipper 20 directly to antenna 24. Accordingly, presented to antenna 24 will be a series of pulses looking like the solid line waveform depicted at D in FIG. 2. Assuming, as has previously been suggested, that the time spanned by both the leading and trailing edges of this pulse (in each case), namely time $t_1$ is one quarter of the wavelength of a 4-megahertz signal, such a series of pulses transmitted to the antenna will resonate or excite a resonant circuit, like circuit 22, constructed for operation at 4-megahertz.

When it is desired to use apparatus 10 to resonante higher-frequency resonant circuits, all that need be done is to increase the gain of control amplifier 18. More specifically, with the gain of the amplifier doubled, the amplifier presents to the input of clipper 20 a waveform like that shown in dash-triple-dot lines designated D in FIG. 2. It will be noted that the slopes of the leading and trailing edges of this amplified wave are twice those of the corresponding edges of the unamplified waveform, namely that shown in solid lines at D in FIG. 2. Hence, when this amplified waveform is clipped by clipper 20, its leading and trailing edges will each span a signal-level change of 0.1 volts within a time interval one-half as that as long as that required in the case of the unamplified waveform. Thus, this amplified waveform is capable of exciting a resonant circuit tuned to twice the frequency just discussed—namely, 8-megahertz.

In dashed lines at D in FIG. 2 is shown yet another amplified waveform which is twice as large (in an amplitude sense) as the waveform just previously discussed. Again, the slopes of its leading and trailing edges are doubled with respect to those shown in the dash-triple-dot waveform, and when this waveform is clipped by clipper 20, what will result is a waveform capable of exciting or resonating a 16-megahertz resonant circuit.

Finally, shown at dash-double-dot lines in FIG. 2 is a waveform whose amplitude is six times that of the unamplified waveform, and which, as a consequence, when clipped by clipper 20, is capable of exciting a resonant circuit tuned to 24-megahertz.

As was mentioned earlier, the quarter-period time span associated with the solid wave form at D is depicted at $t_1$ in FIG. 2. Corresponding quarter period times associated with the other three progressively more amplified waves shown at D are depicted at $t_2$, $t_3$, and $t_4$, respectively, in FIG. 2.

Vertical lines reflecting these four time periods are shown at the bottom of FIG. 2 intersecting both a horizontal graph axis, and a horizontal dashed line positioned +0.1 volts above this axis. The intersections of the vertical time-measuring lines and the dashed horizontal line define the slopes of the waves provided at the output of the clipper for each of the four signal conditions just described above.

It is thus apparent that apparatus 10, simply through adjusting the gain of amplifier 18, is capable of exciting an infinite number of different resonant circuits like circuit 22, even though the apparatus is equipped with but a single-frequency oscillator. Obviously, further, odd frequencies in resonant circuits may be used. The frequency selected for use in oscillation 12 is clearly a matter of design choice. Also, the apparatus may be used with respect to resonant circuits requiring signal-level changes greater or less than the 0.1 volt signal-level change characteristic of circuit 22 herein.

A modification of the invention, which might be useful in certain instances, involves modification of wave shaper 16, whereby the slopes of the leading and trailing edges, waveform C, are made specifically different. This, of course, can be accomplished by techniques well known to those skilled in the art. Where this modification is used, an output signal from the apparatus is capable of simultaneously energizing two distinctly differently tuned resonant circuits.

From the foregoing, the basic method of the invention should be clear. It involves: first, generation of a low-frequency periodic signal having leading and trailing edges; second, amplifying this signal to produce an amplified signal with at least one edge therein exhibiting a time-level slope with sufficient extent over a predetermined time to excite a particular resonant circuit having a certain related resonant frequency which is higher than the first-generated frequency; and third, transmitting the amplified signal to such circuit. Excitation of an infinite number of different resonant circuits is possible through providing for selectively, infinitely variable amplification in the amplification step.

While several modifications have been described herein, and a basic preferred method mentioned, it is recognized that variations and changes are possible without departing from the spirit of the invention.

It is claimed and desired to secure by letters patent:

1. A method of selectively exciting different resonant circuits operable at different frequencies through the use of a signal-producing means operable at a lower frequency, where each of such resonant circuits responds to the receipt of a common predetermined, required signal-level change which takes place over a unique, predetermined time period related to the particular resonant frequency of the circuit, said method comprising generating with such a signal-producing means, and at said lower frequency, a periodic electrical signal having leading and trailing edges, amplifying said electrical signal to produce an amplified signal with at least one of the edges therein exhibiting, over said predetermined time period, a change in signal level substantially matching said predetermined signal-level change, adjusting the amplification applied to said electrical signal to cause said predetermined signal-level change to occur over the unique predetermined time period related to one of such resonant circuits, and transmitting said adjusted, amplified signal to such resonant circuit.

2. A method of exciting a resonant circuit operable at one frequency through the use of a signal producing means operable at a lower frequency, where the resonant circuit responds to an edge of a periodic signal having a predetermined time-level slope extending over a required pedetermined signal-level range, said method comprising generating, with such a signal-producing means, and at said lower frequency, a periodic electrical signal having an edge characterized by a time-level slope smaller than said predetermined time-level slope, amplifying said signal, by said amplifying, producing an amplified signal having an edge exhibiting said predetermined time-level slope and extending at least over said required predetermined signal-level range, and transmitting said amplified signal to said resonant circuit.

3. Apparatus for using one frequency to resonate a selected resonant circuit operable at a higher frequency, where such resonant circuit resonates in response to the receipt of a required predetermined signal-level change which takes place over a predetermined time period, said apparatus comprising signal-producing means operable to produce a periodic electrical signal at said one frequency, with said signal having leading and trailing edges, adjustable amplifying means operatively connected to said signal-producing means for amplifying a signal produced thereby, and adjustable to create an amplified periodic signal with at least one edge therein exhibiting, over said predetermined time period, a signal-level change substantially matching said required predetermined signal-level change, and means for transmitting said amplified signal to such a selected resonant circuit.

* * * * *